Aug. 9, 1949.  J. E. HYBBERT  2,478,583
UNLOADING MECHANISM FOR TRAILER WAGONS
Filed Oct. 18, 1946  2 Sheets-Sheet 1
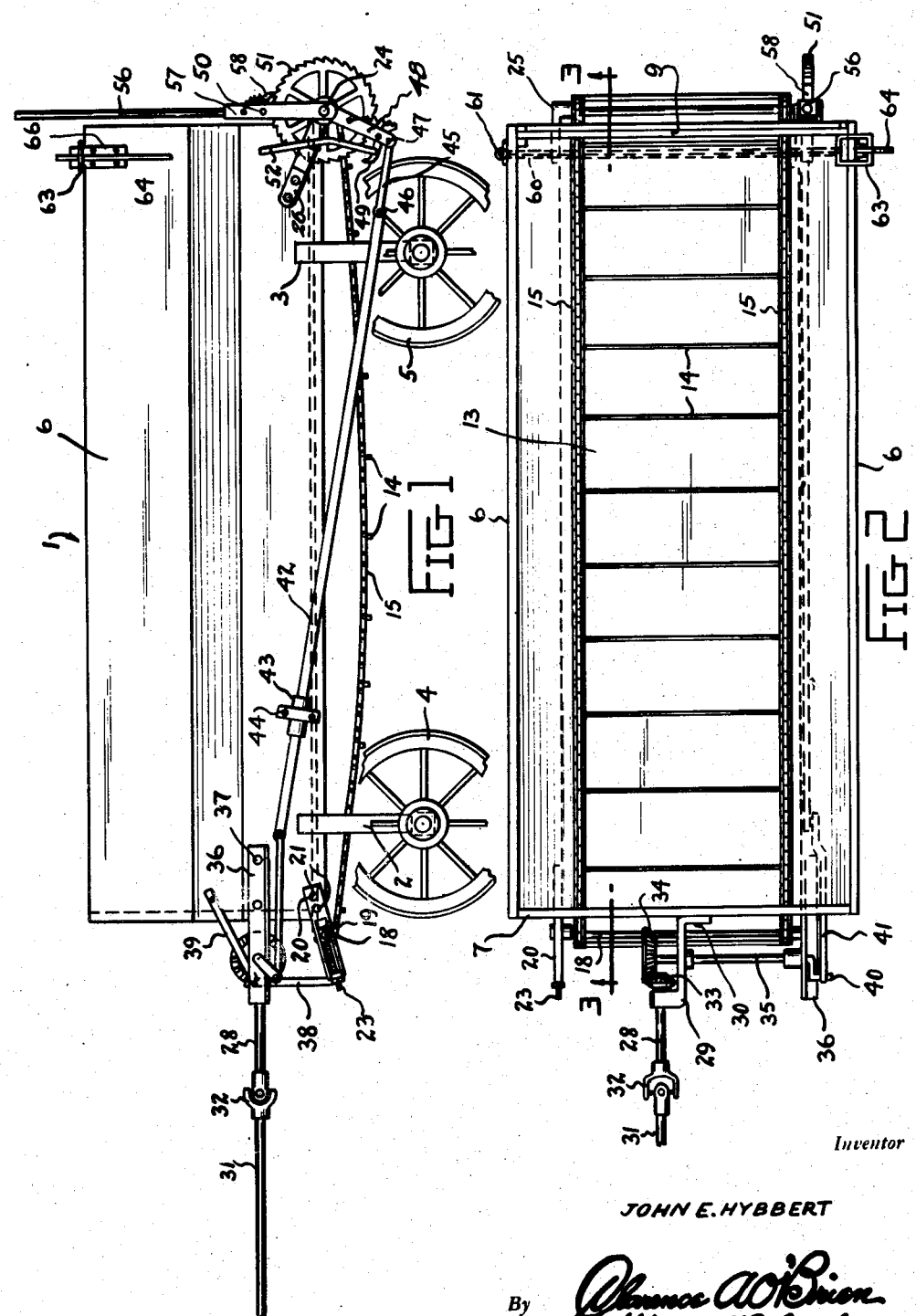
Inventor
JOHN E. HYBBERT
By Clarence A. O'Brien
and Harvey B. Jackson
Attorneys

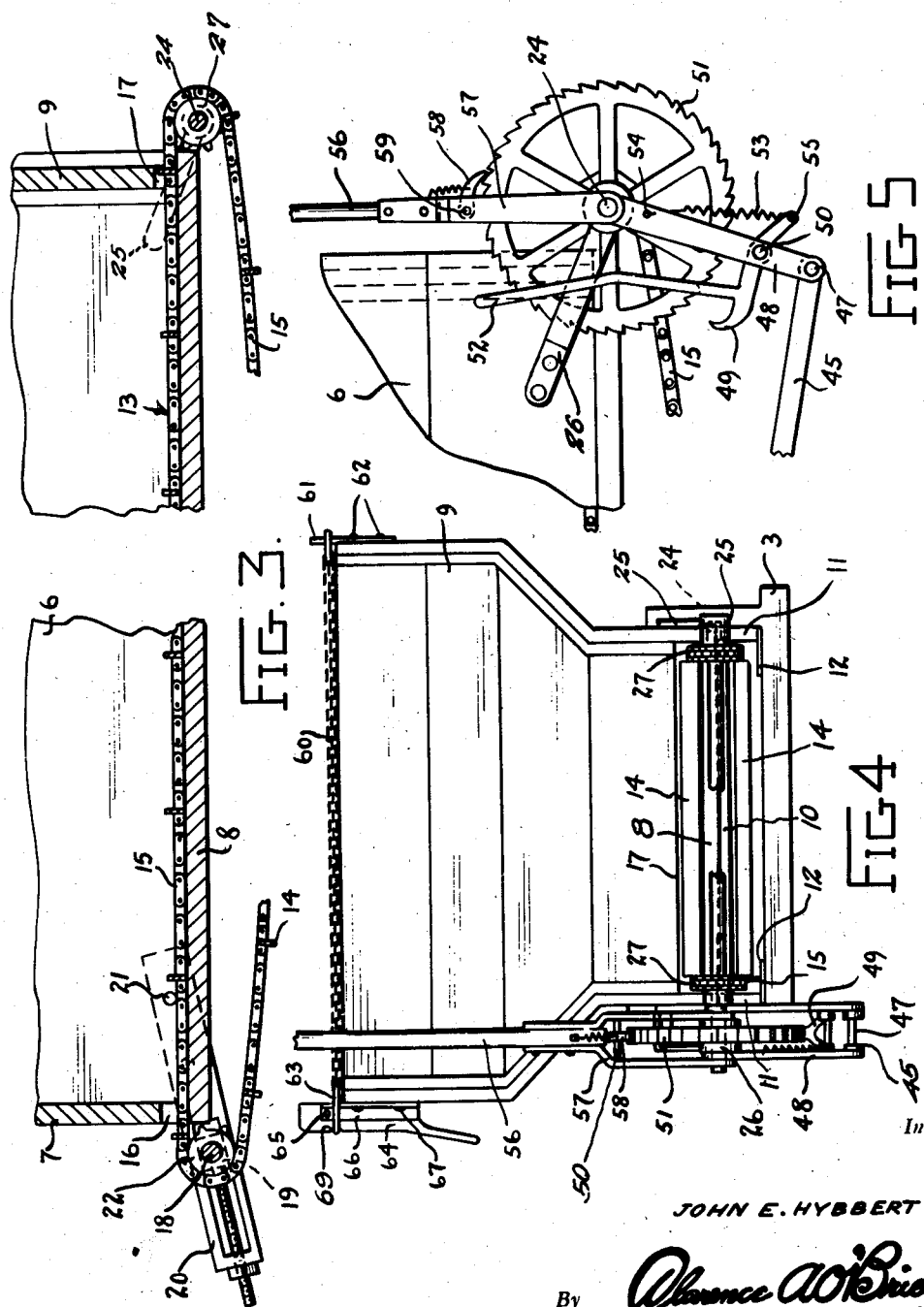

Patented Aug. 9, 1949

2,478,583

UNITED STATES PATENT OFFICE 2,478,583

UNLOADING MECHANISM FOR TRAILER WAGONS

John E. Hybbert, Dunnell, Minn.

Application October 18, 1946, Serial No. 703,938

2 Claims. (Cl. 214—83.36)

My invention relates to improvements in unloading mechanism for trailer wagons of a type designed for transporting in a box body, grain, manure, ensilage, and like materials.

The primary object of the invention is to provide a simply constructed unloading mechanism adapted to be driven by the rear power takeoff of a tractor, or optionally operated by hand, and which may be inexpensively installed on such a vehicle and will not readily get out of order.

Other and subordinate objects also comprehended by my invention, together with the precise nature of my improvements will be readily understood when the succeeding description and claims are read with reference to the drawings accompanying and forming part of this specification.

In said drawings:

Figure 1 is a view in side elevation illustrating my invention in a preferred embodiment thereof.

Figure 2 is a view in plan.

Figure 3 is a fragmentary view in longitudinal section taken on the line 3—3 of Figure 2 and drawn to a larger scale.

Figure 4 is a view in rear elevation drawn to a larger scale.

Figure 5 is a fragmentary view in side elevation showing the parts at the rear ends of the box drawn to a larger scale for clearness of illustration.

Referring to the drawings by numerals, my improved unloading mechanism has been shown therein, by way of exemplifying a preferred embodiment thereof, as forming part of the equipment of a trailer wagon having the form of a conventional grain box 1 carried by front and rear bolsters 2, 3 mounted on suitable front steering wheels 4 and rear wheels 5. The box 1 embodies sides 6, a front end 7, a bottom 8, and a rear, vertically slidable tail gate 9.

As best shown in Figure 4, the box 1 is spaced above the bottoms of the bolsters 2, 3 by suitable spacer bars, one of which is shown at 10 in Figure 4, fitting in the bolster, in this case bolster 3, with downturned ends 11 provided with horizontal foot plates 12 serving a purpose presently seen. The front steering wheels 4 may be mounted in any suitable manner for steering by the usual hitch, not shown, with which such wagons are usually provided for coupling the same to the drawbar of a tractor, not shown.

My improved unloading mechanism comprises, as the basic element thereof, an endless belt type conveyor 13 with the usual cross flights 14, and side sprocket chains 15, and which extends lengthwise through the box 1 from end to end thereof and across said box, with its upper run overlying the bottom 6 to slide thereon and its lower run underlying said bottom 8 and running in the space between the bottom of the bolsters 2, 3 and the spacer bars 10, with the sprocket chains 15 sliding over the foot plates 12. Lower edge recesses 16, 17 in the front end 7 of the box 1 in the tail gate 9 provide for the upper run of the conveyor 13 passing through said box 1.

A front cross shaft 18 is provided forwardly of the box 1 with its ends suitably journaled in bearings 19 slidable forwardly and rearwardly of said box in guide arms 20 bolted, as at 21, to the sides 6 of the box 1 and extending forwardly of the same. Sprocket wheels 22, on the cross shaft 18 and over which the sprocket chains 15 run, support the conveyor 13 at the front end of the box 1. Adjusting bolts 23 in the guide arms 20, suitably connected to the slide bearings 19; provide for adjusting said bearings to tighten or loosen the sprocket chains 15, and hence the conveyor 13, in a manner which will be understood.

A conveyor operating cross shaft 24 is provided in the rear of the box 1 with its ends journaled in rearwardly extending bearing arms 25, 26 suitably fixed to the box 1 at the bottom 8 on opposite sides thereof, the arm 26 being split for a purpose presently seen. Sprocket wheels 27 fast on said shaft 24 and over the which the sprocket chains 15 are trained support the conveyor 13 at the rear end of the box 1.

A drive for the conveyor operating shaft 24 is provided comprising the following.

A drive shaft 28 extends forwardly of the front end 7 of the box 1, in substantially the horizontal center of the box, with its rear end journaled in an L-shaped bearing bracket 29 bolted, as at 30, to the front end 7 of said box. The drive shaft 28 is coupled to a shaft section 31, by a universal joint 32, the section 31 being designed for coupling, in any suitable manner, to the rear power takeoff, not shown, of a tractor. A bevel gear 33, fast on the rear end of the drive shaft 28, meshes with a larger bevel gear 34 fixed on one end of a jack shaft 35 journaled, adjacent said end, in the bearing bracket 29 to extend to one side 6 of the box 1, at which side, said shaft 35 is journaled in a forwardly extending bearing bar 36 on said side 6 of the box, bolted to said side 6, as at 37. A brace 38 extends between said bar 36 and the guide arm 20 on the same side of the box 1, and a brace rod 39 extends above said bar 36 to said side 6 of the box 1. Outwardly of the bearing bar 36, the jack shaft 35 is provided with an end crank 40 operatively connected by a pitman rod 41 to the front end of a downwardly and rearwardly inclined slide rod 42, endwise slidable in a bearing sleeve 43, bolted, as at 44, to the adjacent side 6 of the box 1. A link 45 is pivoted at one end, as at 46, to the rear end of the slide rod 42 with its other end pivoted, as at 47, to and between the lower ends of a pair of side-by-side, laterally spaced, pawl-carrying arms 48, the upper ends of which are rotatable on one end of the conveyor-operating shaft 24 at opposite sides of the bearing arm 26 so that said arms 48 may rock forwardly and rearwardly on said shaft. A pawl 49 is pivoted, as at 50, between said arms 48 adjacent the lower ends thereof, to extend forwardly and be rocked upwardly into the teeth of a ratchet wheel 51 fast on the conveyor operating shaft 24 in the split of the bearing arm 26, said pawl, when engaged with said wheel 51, and when the arms 48 are rocked forwardly, serving to rotate said wheel 51 and said shaft 24 clockwise to move the upper run of the conveyor 13 rearwardly through the box 1.

A pawl-engaging handle 52, upstanding from and rigid with said pawl 49, provides for rocking the pawl clockwise, as viewed in Figures 1 and 5, into engagement with the teeth of the ratchet wheel 51. A spring 53 having its ends fast to one of the pawl-carrying arms 48, and to one end of the pawl 49, as at 54, 55, yieldingly maintains said pawl 49 disengaged from the teeth of the ratchet wheel 51.

As will now be seen, with the drive shaft 28 in operation, the crank 40 of the crank shaft 35 operates to reciprocate the pitman link 41 and thereby reciprocate the slide rod 42, which, through the medium of the link 45, rocks the pawl-carrying arms forwardly and rearwardly on the conveyor operating shaft 24. Also, as will be readily understood, if the pawl 49 is held engaged, by means of the handle 52, with the teeth of the ratchet wheel 51, said wheel will be intermittently rotated clockwise, under forward swinging of the pawl-carrying arms 48, and such intermittent rotation of said wheel 51 will impart a step-by-step feed of the upper run of the conveyor 13 through the box 1, rearwardly, to unload material in said box out of the rear end thereof. Obviously, the tail gate 9 may be lifted, as desired, to permit the material to discharge out of the box 1. By manually engaging and disengaging the pawl 49, through the medium of the handle 52, the unloading of the box 1 may be regulated, as desired, while the described drive, with the exception of the ratchet wheel 51, is in operation.

For manually operating the conveyor operating shaft 24, to feed the conveyor 13 in the same manner as previously described, and whether the drive be idle or not, an upstanding hand lever 56 is provided on the conveyor operating shaft 24 with a lower forked end 57 straddling the ratchet wheel 51 and swingable forwardly and rearwardly on said conveyor operating shaft. A spring pressed pawl 58 is pivoted, as at 59, in said forked end 57 to operate said ratchet wheel 51 in the same manner as the pawl 49.

A chain 60 is extended across the box 1, over the same, at the rear end thereof, with one end fast to an upright 61, bolted, as at 62, to one side 6 of the box 1. A ring 63 is provided on the other end of the chain 60 for hooking over the upper end of a vertical lever 64 pivoted adjacent said upper end, as at 65, between a pair of keeper plates 66, bolted, as at 67, to the other side 6 of the box 1. The lever 64 is vertically swingable to permit the ring 63 to slide off the same and release the chain 60 and is provided with a notch 68 in which the ring 63 may seat and which is located below the pivot 65 when the lever 64 is swung into a vertical position against the adjacent side 6 of the box 1 so that, under the pull of the chain 60, said lever 64 is locked in the described vertical position thereof. When the lever 64 is swung into the described vertical position, the chain 60 is tightened to prevent the sides 6 of the box 1 from spreading apart at the rear end of the box. This provides for holding the tail gate 9 in upwardly adjusted position. When the chain 60 is released, as described, the sides 6 permit the tail gate 9 to slide freely, as will be clear.

The foregoing will, it is believed, suffice to impart a clear understanding by my invention, without further explanation.

Manifestly, the invention, as described, is susceptible of modification without departing from the inventive concept, and right is herein reserved to such modifications as fall within the scope of the appended claims.

What I claim is:

1. The combination with a wheel-supported box-like container having sides and front and rear ends and adapted to contain loose material to be discharged out of said rear end, of an endless conveyor at the bottom of said container having an upper run overlying said bottom and operative to move said run rearwardly to discharge the material out of said rear end, of means to operate said conveyor intermittently comprising a conveyor operating shaft at the rear end of said container, a drive shaft at the front end of said container adapted to be power driven, a rocker on said conveyor operating shaft, pawl and ratchet connections between said rocker and conveyor operating shaft, manual means for rendering said connections effective and ineffective at will, and operating connections between said drive shaft and rocker, said operating connections comprising a reciprocating slide rod, a jack shaft operative by the drive shaft, and having a crank thereon, and a pitman link connecting said crank to said slide rod.

2. The combination with a wheel-supported box-like container having sides and front and rear ends and adapted to contain loose material to be discharged out of said rear end, of an endless conveyor at the bottom of said container having an upper run overlying said bottom and operative to move said run rearwardly to discharge the material out of said rear end, of means to operate said conveyor intermittently comprising a conveyor operating shaft at the rear end of said container, a drive shaft at the front end of said container adapted to be power driven, a rocker on said conveyor operating shaft, pawl and ratchet connections between said rocker and conveyor operating shaft, manual means for rendering said connections effective and ineffective at will, and operating connections between said drive shaft and rocker, said operating connections comprising a reciprocating slide rod, a jack shaft operative by the drive shaft, and having a crank thereon, a pitman link connecting said crank to said slide rod, and a pivoted link connecting said slide rod to said rocker.

JOHN E. HYBBERT.

(References on following page)

REFERENCES CITED

The following references are of record in the file of this patent:

UNITED STATES PATENTS

| Number | Name | Date |
|---|---|---|
| 1,497,622 | Weber | June 10, 1924 |
| 1,809,796 | Beardsley et al. | June 9, 1931 |
| 2,233,111 | Roberts | Feb. 25, 1941 |
| 2,321,168 | Tognetti | June 8, 1943 |
| 2,340,983 | Pfeiffer et al. | Feb. 8, 1944 |
| 2,345,328 | Conway et al. | Mar. 28, 1944 |
| 2,434,718 | Recker | Jan. 20, 1948 |
| 2,462,400 | Kahres et al. | Feb. 22, 1949 |